E. L. P. COLARDEAU.
ELECTRICAL DRIVING MEANS.
APPLICATION FILED OCT. 27, 1917.

1,416,611.

Patented May 16, 1922.

Witnesses:
C. A. Rowe

Inventor
Emmanuel L. P. Colardeau
by
Attorney

E. L. P. COLARDEAU.
ELECTRICAL DRIVING MEANS.
APPLICATION FILED OCT. 27, 1917.

1,416,611.

Patented May 16, 1922.
2 SHEETS—SHEET 2.

Witnesses:
C. A. Rowe

Inventor
Emmanuel L. P. Colardeau
by
Attorney

UNITED STATES PATENT OFFICE.

EMMANUEL LOUIS PAUL COLARDEAU, OF PARIS, FRANCE, ASSIGNOR TO HENRY CROCHAT, OF PARIS, FRANCE.

ELECTRICAL DRIVING MEANS.

1,416,611.  Specification of Letters Patent.  Patented May 16, 1922.

Application filed October 27, 1917. Serial No. 198,836.

*To all whom it may concern:*

Be it known that I, EMMANUEL LOUIS PAUL COLARDEAU, citizen of the French Republic, residing at Paris, France, have invented certain new and useful Improvements in Electrical Driving Means, of which the following is a specification.

The invention relates to improvements in the driving, by electricity, of several shafts which are adapted to rotate at different speeds of the kind described is specification No. 115,479 filed by Henry Crochat on the 17th August, 1916, and more particularly to driving gear for motor vehicles of the kind in which an endless chain passes over the wheels mounted at one and the same side of the vehicle and in which the steering can only be effected by differing the speed of rotation of one set of driving wheels.

The invention has for its object to enable driving gears to be designed so as to be of greater efficacy, whilst not requiring such great precision as hitherto in the construction of the windings of the motor which they comprise.

The invention further relates to those driving gears which use as many series motors as there are shaft to be driven, the armature of each of the said motors being keyed to the shaft to be driven by it, and mounted in parallel.

The invention comprises a driving gear of of the kind hereinbefore referred to, in which the field magnet winding of the motors are divided into two elements, the first of which are connected in series, and the second in parallel, thus avoiding the necessity of proportioning precisely the field windings.

Apart from this main arrangement, it comprises certain other arrangements which will be more explicitly referred to hereinafter.

The invention will be diagrammatically illustrated in the accompanying drawings, given by way of example, in which.

According to the invention on the axle of the right hand driving wheel is mounted the armature $a$ of a series motor, and on the axle of the left hand driving wheel the armature $b$ of a series motor of identical construction.

The armatures $a$ and $b$ of these two motors are connected in parallel with the generator dynamo $c$ while the elements $a'$ and $b'$ of the field magnet windings of the same motors are connected in series, and the other elements $a^2$ $b^2$ of the field magnet windings of the same motors are connected in parallel circuits.

Figure 1:
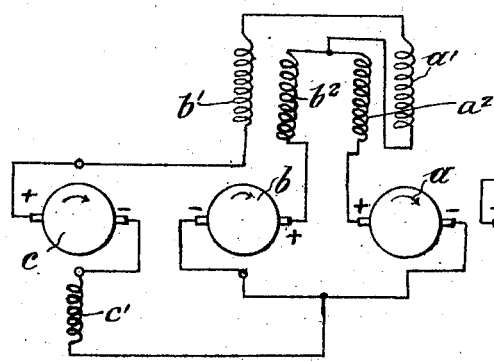
Figures 1–7 show a drive for two shafts in seven different ways in which its connections can be modified.

In that way an installation is obtained in which as shown in Figure 1, the two motors have the tendency to rotate at the same speed, and the vehicle will travel in a straight line.

For turning, it is necessary to make the motor corresponding to the driving wheel which is on the inside of the curve, rotate at a lower speed than that of the motor corresponding to the driving wheel which is on the outside of the curve.

Figure 2:
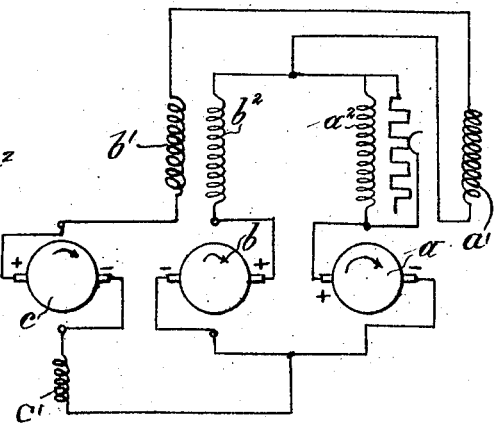

In order to obtain the result in question the connections are modified in the following manners which are indicated in the order of their efficacy: When a turn of large radius is to be made, the means which produces a relatively small differential speed between the two motors, is used; and when a shorter turn is to be made, the means which produces a greater differential speed between the two motors, is used; for example:

By shunting the part of the field magnet winding of the motor which must rotate at a greater speed, for instance when it is desired to turn to the left, the field magnet winding $a^2$ of the motor of the right hand driving wheel is shunted which shunting may if necessary be regulated by means of a resistance $a^{20}$ (Figure 2).

Figure 3:
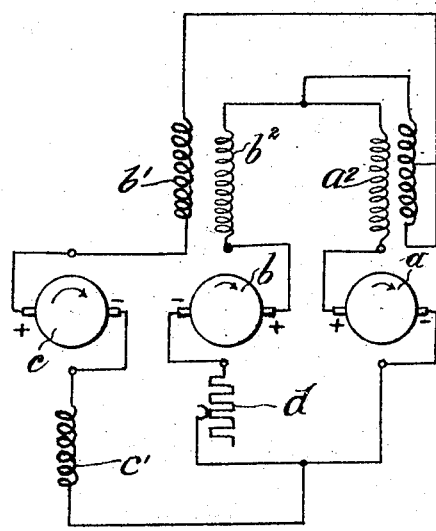
Figure 4:
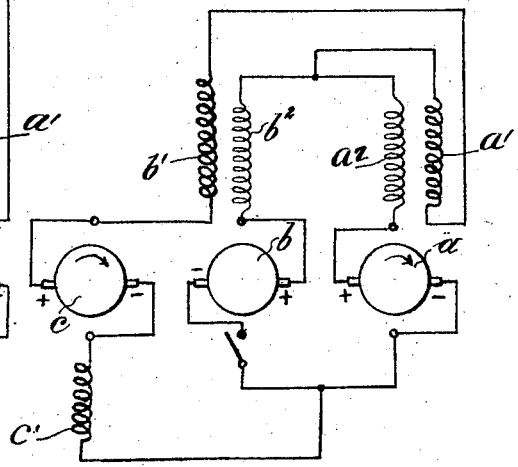

By inserting a resistance $d$ into the armature circuit of the motor which must rotate at a lower speed, this resistance producing a reduction of the torque of the said motor when it is desired to turn to the left, for instance, as shown in Figure 3, by inserting into the circuit of the armature $b$ of the motor of the left hand driving wheel, a resistance $d$ which if necessary is adjustable. The effect thus obtained can be rendered maximum by making the said resistance infinite, that is to say, and as shown in Figure 4, by breaking or opening the supply circuit of the armature so that the torque is reduced to zero.

Figures 5, 6:
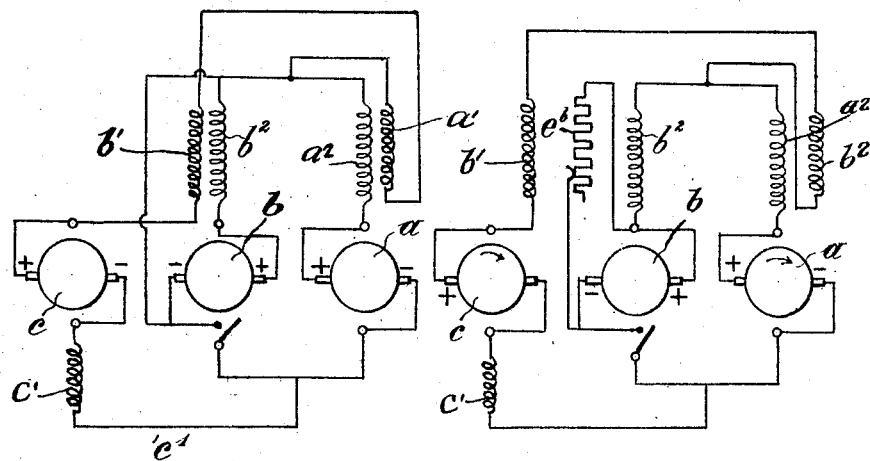

By not only opening the supply circuit of the armature of the motor which it is desired to rotate at the lowest speed but also simultaneously shunting such armature and element $b^2$ (Figure 5) the field magnet winding, of this same motor, its braking is obtained, which is useful when it is desired to turn to the left. This switching of the circuits is shown in Figure 5, the circuit of the armature $b$ of the motor of the left hand drive is open and the shunting of the said armature $b$ and the field magnet winding $b^2$ is effected through a wire visible to the left of said motor $b$ in Figure 5.

By opening the armature supply circuit of that motor which must rotate at a lower speed, the active torque of this motor is reduced to zero, and by simultaneously shunting the armature of such motor alone, a braking effect will be produced on such motor, the intensity of which braking effect can, if necessary, be varied by means of an adjustable resistance inserted in the armature supply circuit of the said motor. The connections and switching necessary to obtain these results are shown in Figure 6, in which it is supposed that the left hand motor is to run slower than the other to make a turn of the vehicle to the left.

The supply circuit of the armature $b$ of the left hand motor driving the left hand vehicle wheel-system is opened by the switch shown, and the said armature $b$ is shunted by means of a resistance $e^b$ which, if necessary, is adjusted in such a way that it is capable of becoming zero, thus obtaining the maximum of braking effect.

When, on the contrary, it is desired to exercise not an unequal but an equal braking action on the two driving wheels, a braking action is obtained by working the two motors as generators, and the generator $c$ as a motor. The said generator then drives in its turn the explosion engine, the ignition of which has been cut off, and which works in that case as an air compressor.

Figures 7, 8:
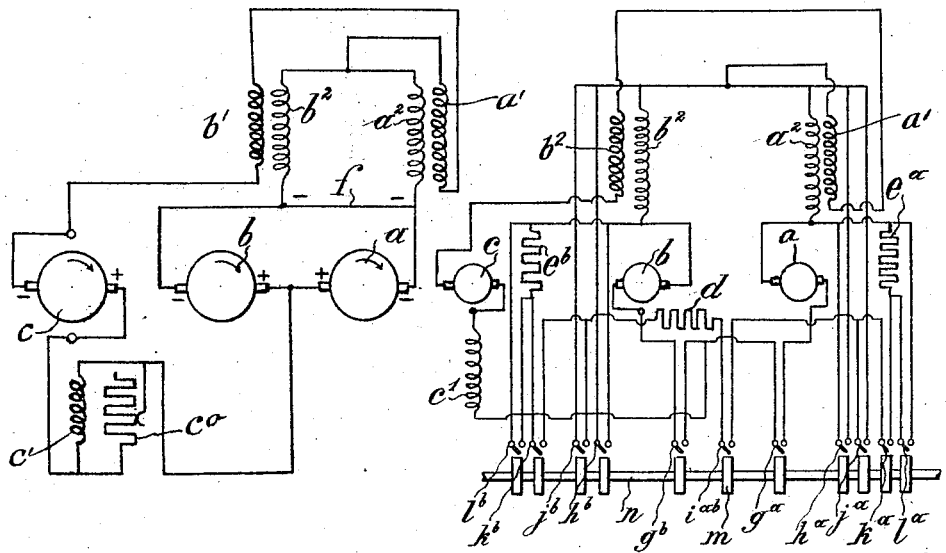
Figure 8 shows the same drive and indicates an arrangement enabling the modification of the connections to be effected in a simple manner.

In order to arrive at such a result, it is only necessary, as shown in Figure 7, to reverse the brushes of the two motors $a$ and $b$, (so that a demagnetizing effect, which would occur in the magnetizing windings when, during the action of the motors as generators, the current is reversed in the armature without reversing the polarity of the brushes, is avoided). In order to facilitate the equality of the braking effects, it is useful to connect together those terminals of the same polarity of the two armatures which are in contact with the parallel-connected magnetizing elements $a^2$, and $b^2$ by a balance wire $f$, so as to balance the braking actions of the two motors $a$ and $b$, and finally it is also necessary to reverse the series field-magnet winding $c^1$ of the generator $c$ in order that it may function as a motor without changing its direction of rotation.

The braking strength of the action can then be easily regulated, either by shunting the field magnet winding $c^1$ of the generator $c$ by means of an adjustable resistance $c^o$ which if necessary can become zero, or by acting on the resisting torque of the explosion engine connected with the generator now working as a motor by varying the admission of gas, or the timing of the ignition of the explosion engine. In the latter cases, the action of the explosion engine though reduced assists the dynamo $c$ to turn the same when it is working as a motor, the braking action being thus reduced.

For the purpose of making the various connections by means of which turning on different radii can be effected one of the combinations being used at a time, and the use of the most effective combination producing a turn of the shortest radius, a series of switches are so arranged opposite cams mounted on a single shaft that, for one position of the cam shaft, the connections are obtained which correspond to those shown in Figure 1. By turning the cam shaft in one direction, the switches are successively operated for obtaining the different connections shown in Figures 1–6 for turning in one direction and by turning the cam shaft in the opposite direction, the switches are successively operated to obtain the various corresponding connections for turning in the other direction.

For instance, (Figure 8), the two switches $g^a$ and $g^b$ open or close respectively the supply circuit of the corresponding armature $a$ or $b$. (One of these switches is seen open in Figures 4, 5 and 6.) The two switches $h^a$ and $h^b$ open or close respectively the circuit shunting the corresponding element $a^2$, $b^2$, of the field magnet windings. (This combination is shown in Figure 2.) The switch $i^{ab}$ opens or closes the circuit of the resistance $d$. (This combination is shown in Figure 3.) The two switches $j^a$ and $j^b$ open or close respectively the circuit shunting simultaneously the armature $a$ and the field magnet winding $a^2$ or the circuit shunting the armature $b$ and the field magnet winding $b^2$. The two switches $k^a$ and $k^b$ open or close respectively the circuit shunting by means of the resistance $e^a$ or $e^b$ the corresponding armature $a$ or $b$. The two switches $l^a$ and $l^b$ open or close respectively the circuit shunting the corresponding resistance $e^a$ or $e^b$, thus reducing its effect to zero and obtaining the maximum uni-lateral braking effect. The proper position of the cams in order to produce successively the combinations specified, is not shown as it is easily understandable from the switching diagrams of the different figures.

The simultaneous braking of the two sides of the vehicle, as well as the consequent influence exerted on the resisting torque of the explosion motor (through successively cutting down the supply of gases thereto and retarding beyond normal, the timing of the ignition or cutting it totally out) can be eventually controlled by special levers or a combined cam-lever analogous to that which controls the turning of the vehicle and may comprise a series of cams m, mounted on a single shaft n by means of one series of cams m mounted on a single shaft n.

Obviously the invention comprises many modifications, particularly those in which electrical driving gear is so arranged either to render it possible to make simultaneously certain connections which have been provided, only made separately, or so as to render it possible to make only a part of the connections indicated. It is also possible to use, for instance a controller as now used on tramways for making connections.

I claim as my invention—

1. A method of electrically steering a vehicle of the type comprising two motors in conjunction with an engine driven generator, said motors being adapted to drive shafts individual thereto, differences in the speeds of the two motors operating to turn the vehicle, said driving gear embodying two motors, the field winding of each of which is divided into a first and a second cumulative element, the first element of the field winding of one motor being connected in series with the first field winding element of the other motor, such series connection beginning with one pole of the engine driven generator and ending with a branching point, the second field winding element of each of the two motors being connected between said branching point and one of the brushes of the respective motors, which method comprises producing, in the following sequence, connections resulting in differences of speed, to different degrees, in the two halves of the system in order to execute different radii of turns of the vehicle:—first, reducing the strength of the magnetizing current in the second field winding element of each motor which is to run at a higher speed, by shunting said field winding element through an adjustable resistance which, when operated, gradually diminishes the current received by the said second field winding element, second, inserting an adjustable resistance into the supply circuit of the armature of each motor which is to run at a lower speed, third, breaking the supply circuit of each of the motors which is to run idle, fourth, breaking the said supply circuit and shunting that element of the circuit of each motor which is to be braked in order to cause the vehicle to turn more sharply, which supply circuit is formed by the armature and the corresponding second field winding element of the respective motor, and fifth, increasing the braking action by breaking the supply circuit and shunting, by means of an adjustable resistance capable of becoming zero, the armature of each motor on which a particularly strong braking effect is to be produced, when a still sharper turning is to be executed by the vehicle.

2. An electric driving gear for vehicles of the type comprising two motors in conjunction with an engine-driven generator, said motors being adapted to drive shafts individual thereto, differences in the speeds of the two motors operating to turn the vehicle, said driving gear embodying two motors, the field winding of each of which is divided into a first and a second cumulative element, the first element of the field winding of one motor being connected in series with the first field winding element of the other motor, such series connection beginning with one pole of the engine-driven generator and ending with a branching point, the second field winding element of each of the two motors being connected between said branching point and one of the brushes of the respective motors, in combination with means for shunting the second field winding element of either one of the motors, means for inserting a variable resistance into the armature supply circuit of either of the motors, means for interrupting the armature supply circuit of either of the motors, means for interrupting the armature supply circuit of either of the motors and simultaneously shunting a circuit part comprising the armature and the second field winding element of the corresponding motor, and means for interrupting the armature circuit of one of the motors and shunting such armature circuit.

3. An electric driving gear for vehicles of the type comprising two motors in conjunction with an engine-driven generator, said motors being adapted to drive shafts individual thereto, differences in the speeds thereof effecting the turning of the vehicle, said driving gear embodying two motors, the field winding magnet of each of which is divided into a first and a second cumulative element, the first element of the field winding of one motor being connected in series with the first field winding element of the other motor, such series connection beginning with one pole of the engine-driven generator and ending with a branching point, the second field winding elements of the two motors being connected between said branching point and one of the brushes of the respective motors, in combination with means including a shaft having cams thereon and cooperating switches and resistances operative to shunt the second field winding element of either of the motors by a resistance adapted to be gradually reduced, to insert into the supply circuit of the armature of either of the two motors another resistance adapted to be gradually increased; to interrupt the armature supply circuit of either of the motors and simultaneously shunt a circuit part comprising the armature and the second field winding element of the corresponding motor, and to interrupt the armature circuit of either of the motors and shunt its armature circuit.

In testimony whereof I have hereunto set my hand in presence of two subscribing witnesses.

EMMANUEL LOUIS PAUL COLARDEAU.

Witnesses:
CHAS. P. PRESSLY,
EUGENE TULLIER.